United States Patent
Dahlen et al.

(10) Patent No.: US 6,769,041 B2
(45) Date of Patent: Jul. 27, 2004

(54) METHOD AND APPARATUS FOR PROVIDING BIMODAL VOLTAGE REFERENCES FOR DIFFERENTIAL SIGNALING

(75) Inventors: Eric J. Dahlen, Portland, OR (US); Leonard W. Cross, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 10/114,157

(22) Filed: Apr. 1, 2002

(65) Prior Publication Data

US 2002/0108067 A1 Aug. 8, 2002

Related U.S. Application Data

(63) Continuation of application No. 09/385,977, filed on Aug. 30, 1999, now Pat. No. 6,449,669.

(51) Int. Cl.[7] .............................................. G06F 13/14
(52) U.S. Cl. .............................. 710/62; 365/63; 365/68; 365/149
(58) Field of Search ............................ 710/62; 365/149, 365/63, 68

(56) References Cited

U.S. PATENT DOCUMENTS

| | | | |
|---|---|---|---|
| 3,679,917 A | * | 7/1972 | Bryant et al. ............... 307/297 |
| 4,990,846 A | | 2/1991 | Buck et al. |
| 5,748,134 A | | 5/1998 | Dent |
| 5,905,403 A | | 5/1999 | Gillette |
| 6,087,852 A | * | 7/2000 | Briggs et al. ................ 326/68 |
| 6,124,743 A | | 9/2000 | Yang |
| 6,133,863 A | | 10/2000 | Peng |
| 6,177,899 B1 | | 1/2001 | Hsu |
| 6,310,796 B1 | | 10/2001 | Song |
| 6,449,669 B1 | * | 9/2002 | Dahlen et al. ............... 710/62 |

OTHER PUBLICATIONS

Intel Corporation, "Accelerated Graphics Port Interface Specification", Chapter 4, Revision 2.0, May 4, 1998, pp.155–207.

* cited by examiner

Primary Examiner—A. Elamin
(74) Attorney, Agent, or Firm—Blakely, Sokoloff, Taylor & Zafman LLP

(57) ABSTRACT

According to an embodiment of the invention, systems, apparatus and methods are disclosed for providing bimodal voltage references for use in differential signaling between components or devices. According to an embodiment, a switchable power supply is used to produce at least one of two or more supply voltages based on the value of a selection signal received by the switchable power supply. This selection signal is also used by at least one of the elements to switch between a reference voltage produced by another device and a reference voltage derived from the supply voltage. In certain embodiments, the reference voltage derived from the power supply and the selection via a multiplexing circuit is contained within one of the devices (e.g., a chip), which provides certain design and cost advantages.

17 Claims, 4 Drawing Sheets

METHOD AND APPARATUS FOR PROVIDING BIMODAL VOLTAGE REFERENCES FOR DIFFERENTIAL SIGNALING

RELATED APPLICATIONS

This application is a continuation of application Ser. No. 09/385,977, filed Aug. 30, 1999 now U.S. Pat. No. 6,449,669.

FIELD OF THE INVENTION

This invention relates to computer systems and circuits; and more particularly, to methods and apparatus for generating an appropriate reference voltage level for differential signaling.

BACKGROUND OF THE INVENTION

Computer systems are consistently being updated to operate at faster rates. In doing so, many of the components of these system must operate within new parameters, or be replaced at an additional cost. Achieving these higher operating rates further requires devices within these systems to communicate among themselves at faster rates.

A technique employed to increase the rate at which two devices can communicate with each other is decreasing the voltage swing between a communication signals high and low values. Typically, this includes reducing the supply voltage level at which these devices operate. This decrease in voltage swing allows a signal to transition faster between values. However, as this voltage swing is decreased, additional precautions must be taken to ensure that noise does not interfere with the signal.

Differential signaling is one method used in communicating between devices in a system and is useful in avoiding errors induced by noise. Typically, each sending device provides a voltage reference and a communication signal which are typically connected to a differential amplifier. Because approximately the same noise is typically induced on both the voltage reference and a communication signal, a receiving differential amplifier produces a relatively "clean" communications signal.

However, not all sending devices can provide an appropriate reference voltage. For example, when a system is upgraded or a new version is introduced that requires a different reference voltage level and possibly uses a different supply voltage, an older component of the system might not be able to provide the new reference voltage.

Such is the problem introduced by the Accelerated Graphics Port ("AGP") Interface Specification Revision 2.0, May 1998, which requires a universal AGP target (such as the 82465GX GXB manufactured by Intel Corporation) to support both 3.3 Volt and 1.5 Volt operation on the AGP interface supply voltage (Vddq). The specification stipulates a voltage reference that is nominally 0.5*Vddq for 1.5 Volt operation, and nominally 0.4*Vddq for 3.3 Volt operation. Therefore, the value of the reference voltage must be adjusted to match the requirements based on the supply voltage used. What is needed is a system for efficiently providing the appropriate reference voltage.

SUMMARY OF THE INVENTION

According to the invention, systems, apparatus and methods are disclosed for providing one or more bimodal reference voltages for using in differential signaling. Typically, a system comprises a first component requiring a first reference voltage; a second component requiring a second reference voltage; a power source to produce a supply voltage; a first voltage reducer electrically coupled to the power source, the first voltage reducer to produce a third reference voltage using the supply voltage; a multiplexor electrically coupled to the first voltage reducer to produce the first reference voltage by selecting between at least the third reference voltage and a fourth reference voltage; and a second voltage reducer electrically coupled to the power source and to the second component, the second voltage reducer to produce the second reference voltage using the supply voltage.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
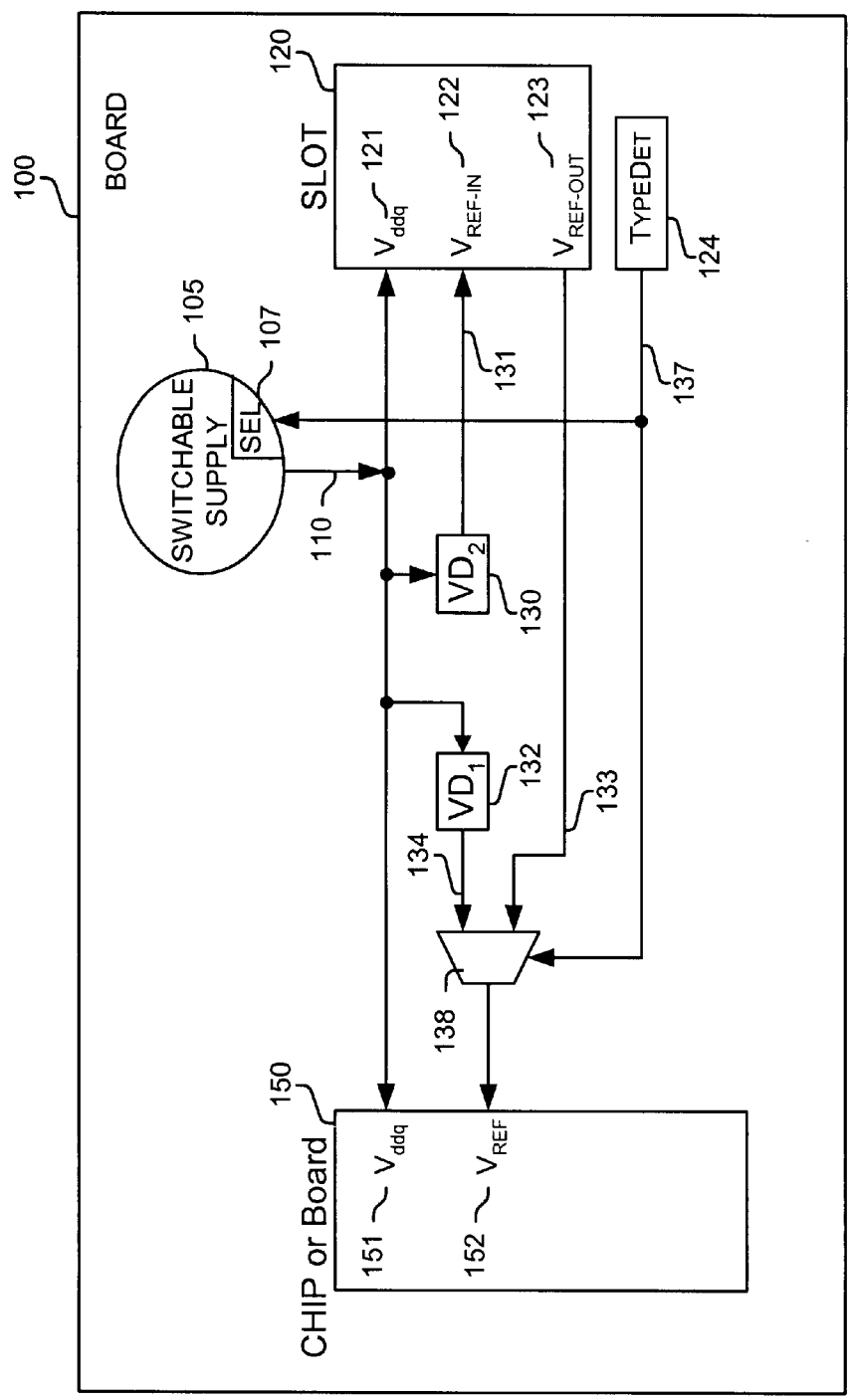
FIG. 1 is a block diagram of a first embodiment for providing a bimodal reference voltage for use in differential signaling.

Turning to FIG. 1, illustrated is a block diagram of a first embodiment for providing bimodal voltage references for use in differential signaling. A typical application of the invention is for use in differential signaling between two components of a board 100, although the invention is not so limited. For example, board 100 could comprise a motherboard, a card, a substrate, or any other circuit on zero or more boards.

As shown in the exemplary configuration illustrated in FIG. 1, two voltage references $V_{REF}$ 152 and $V_{REF-IN}$ 122 are used in differential signaling between the chip or board 150 and slot 120, respectively. Based on the value of TYPEDET signal 137, the illustrated embodiment selects, via selection input 107, one of two operational modes of a bimodal switchable power supply 105, and selects, via a selection input of multiplexor 138, an appropriate signal to be used as $V_{REF}$ 152.

The operational mode of the circuitry illustrated in FIG. 1 is determined based on the value of TYPEDET signal 137 received from TYPEDET mechanism 124. TYPEDET mechanism 124 can be a received external signal or created by a physical switch, jumpers, or other well-known mechanisms to produce a bimodal signal (or other signal having two or more states). In a first operational mode, slot 120 produces the reference voltage 133 required as an input for chip or board 150. In a second operational mode, the appropriate reference voltage 134 is produced from the supply voltage 110 using a voltage divider circuit ($VD_1$) 132 (or some other voltage reduction mechanism). Which one of these two reference voltages 133, 134 to be used by chip or board 150 as $V_{REF}$ 152 is selected by multiplexor 138 based on the value of the TYPEDET signal 137 received at the selection input of multiplexor 138.

Additionally, in a typical configuration of a first embodiment, a bimodal switchable power supply 105 selects between one or more voltage levels. In other embodiments, two or more different power supplies could be used, whether simultaneously located on board 100 or physically swapped out to match the operational mode of the illustrated circuitry. Switchable supply 105 provides a supply voltage 110 to $V_{ddq}$ 151 of chip or board 150 and to $V_{ddq}$ 121 of slot 120.

Referring now to the voltage reference signal 131 received on $V_{REF-IN}$ 122 on slot 120, voltage reference signal 131 is derived from the supply voltage 110 via voltage divider (VD$_2$) 130. VD$_2$ 130 is sized according to the design specifications which may include the voltage level of the supply voltage 110 and the type of logic used in implementing an embodiment. In other embodiments in which chip or board 150 produces its own reference voltage, the reference voltage could be received on $V_{REF-IN}$ 122 directly or via a multiplexor arrangement similar to that illustrated in FIG. 1 for $V_{REF}$.

Figure 2:
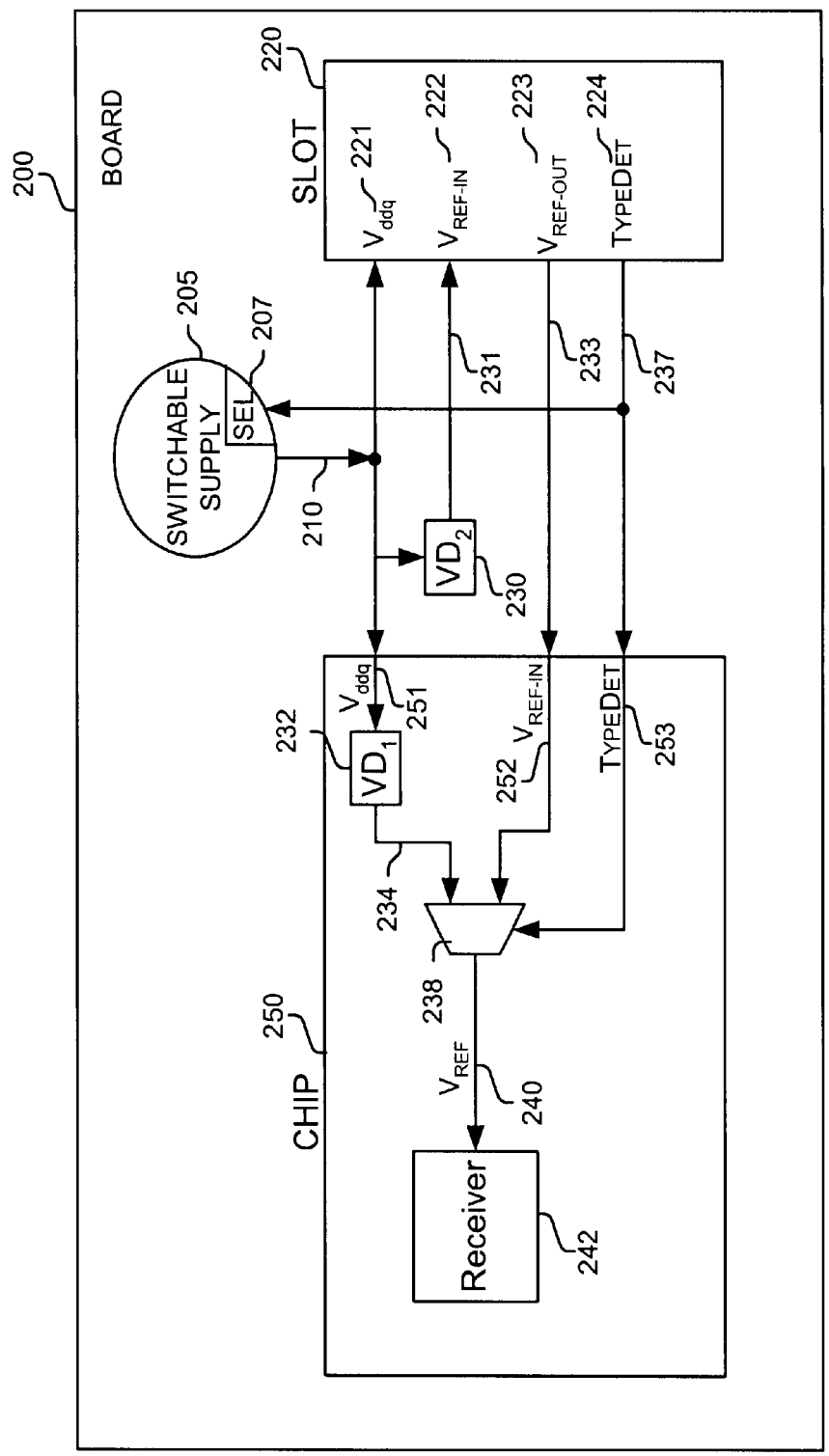
FIG. 2 is a block diagram of a second embodiment for providing a bimodal reference voltage for use in differential signaling.

Turning now to FIG. 2, illustrated is a block diagram of a second embodiment for providing bimodal voltage references for use in differential signaling. As shown in the exemplary configuration illustrated in FIG. 2, two voltage references $V_{REF}$ 240 and $V_{REF-IN}$ 222 are used in differential signaling between the chip 250 and slot 220, respectively. Based on the value of TYPEDET signal 237, the illustrated embodiment selects, via selection input 207, one of two operational modes of a bimodal switchable power supply 205, and selects, via a selection input of multiplexor 238, an appropriate signal to be used as $V_{REF}$ 240 which is used by receiver 242.

The operational mode of the circuitry illustrated in FIG. 2 is determined based on the value of TYPEDET signal 237 received from slot 220. In a first operational mode, slot 220 produces the reference voltage 233 required as input for chip 250 on input $V_{REF-IN}$ 252 and relayed to multiplexor 238. In a second operational mode, the appropriate voltage reference signal 234 is produced from the supply voltage 210 received on input $V_{ddq}$ 251 using a voltage divider circuit (VD$_1$) 232 (or some other voltage reduction mechanism). One of the two reference voltages 233 and 234 to be used by chip 250 as $V_{REF}$ 240 is selected by multiplexor 238 based on the value of the TYPEDET signal 237 received on the TYPEDET input 253 of chip 250 and relayed to the selection input of multiplexor 238. Several design advantages are achieved in the second embodiment by having VD$_1$ 232 and multiplexor 238 on chip 250 because the operational requirements (e.g., power consumption, amperage) of the chip 250 are known a priori. Thus, VD$_1$ 232 and multiplexor 238 can be appropriately and cost-effectively designed to match the operational requirements of chip 250, without having to vastly over-engineer the design to accommodate an unknown chip 250.

Additionally, in a typical configuration of a second embodiment, a bimodal switchable power supply 205 is used to select between one or more voltage levels. In other embodiments, two or more different power supplies could be used, whether simultaneously located on board 200 or physically swapped out to match the operational mode of the illustrated circuitry. Switchable supply 205 provides a supply voltage 210 to $V_{ddq}$ 251 of chip 250 and to $V_{ddq}$ 221 of slot 220.

Referring now to the voltage reference signal 231 received on $V_{REF-IN}$ 222 on slot 220, voltage reference signal 231 is derived from the supply voltage 210 via voltage divider (VD$_2$) 230. VD$_2$ 230 is sized according to the design specifications that may include the voltage level of the supply voltage 210 and the type of logic used in implementing an embodiment. In other embodiments in which chip 250 produces its own reference voltage, the reference voltage could be received on $V_{REF-IN}$ 222 directly or via a multiplexor arrangement similar to that illustrated in FIG. 2 for $V_{REF}$.

Figure 3:
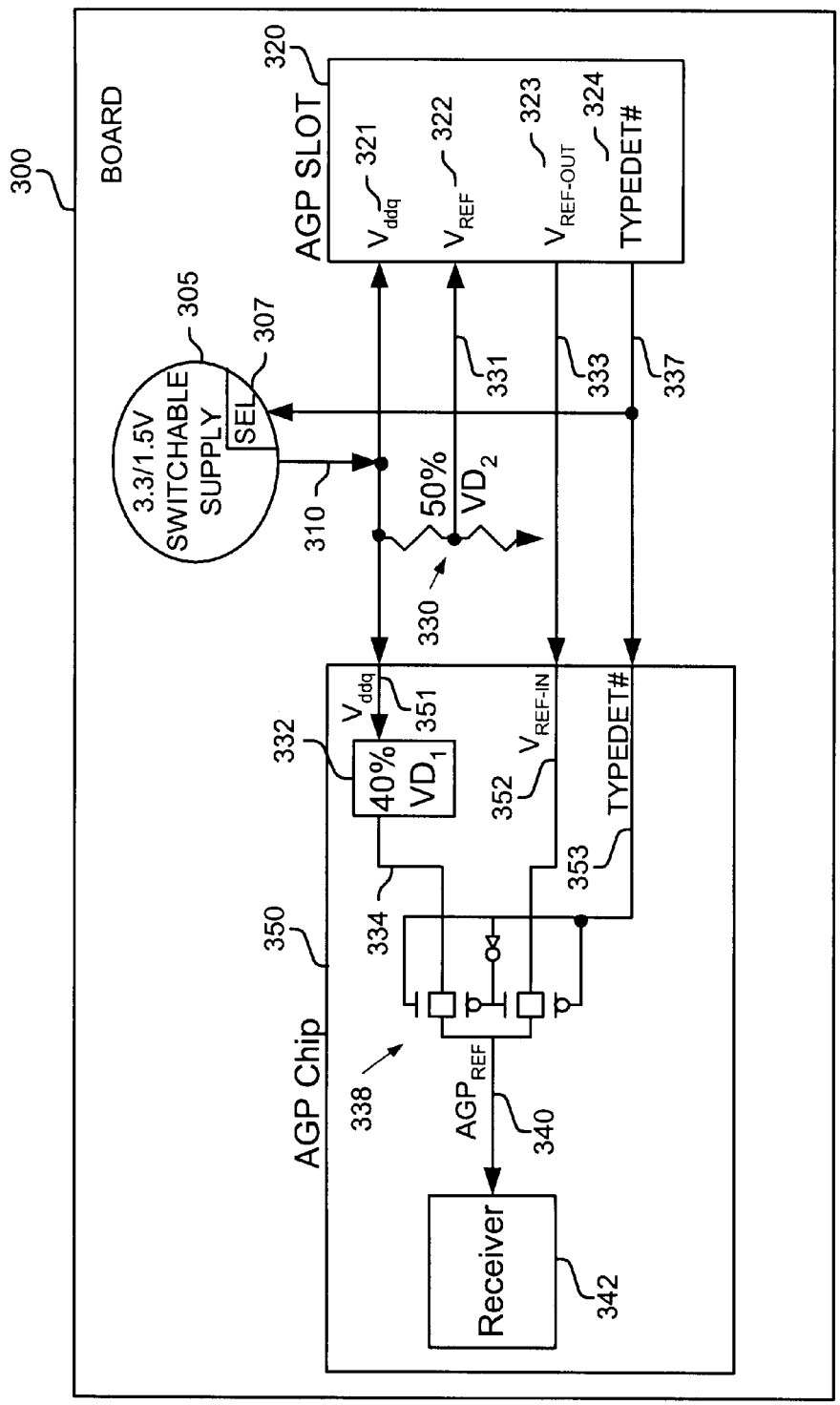
FIG. 3 is a block diagram of a third embodiment for providing a bimodal reference voltage for use in differential signaling.

Turning now to FIG. 3, illustrated is a block diagram of a third embodiment for providing bimodal voltage references for use in differential signaling. As shown in the exemplary configuration illustrated in FIG. 3, two voltage references AGP$_{REF}$ 340, $V_{REF-IN}$ 322 are used in differential signaling between Accelerated Graphics Port (AGP) slot 320 and AGP chip 350, respectively. Based on the value of TYPEDET# signal 337, the illustrated embodiment selects, via selection input 307, one of two operational modes of a bimodal switchable power supply 305, and selects, via a selection input of multiplexor 338, an appropriate signal to be used as AGP$_{REF}$ 340 by receiver 342.

The operational mode of the circuitry illustrated in FIG. 3 is determined based on the value of TYPEDET# signal 337 received from AGP slot 320. In a first operational mode, AGP slot 320 produces the reference voltage 333 required as input for AGP chip 350 on input $V_{REF-IN}$ 352 and relayed to multiplexor 338. In a second operational mode, the appropriate voltage reference signal 334 is produced from the supply voltage 310 received on input $V_{ddq}$ 351 using a voltage divider circuit (VD$_1$) 332 (or some other voltage reduction mechanism). Typically, VD$_1$ 332 is a forty percent (40%) voltage reduction circuit. One of these two reference voltages 333 and 334 to be used by AGP chip 350 as AGP$_{REF}$ 340 is selected by multiplexor 338 based on the value of the TYPEDET# signal 337 received on the TYPEDET# input 353 of AGP chip 350 and relayed to the selection input of multiplexor 338.

Several design advantages are achieved in the third embodiment by having VD$_1$ 332 and multiplexor 338 on AGP chip 350 because the operational requirements (e.g., power consumption, amperage) of the AGP chip 350 are known a priori. Thus, VD$_1$ 332 and multiplexor 338 can be appropriately and cost-effectively designed to match the operational requirements of AGP chip 350, without having to vastly over-engineer the design to accommodate an unknown AGP chip 350. For example, a typical, very simple multiplexor design is illustrated in FIG. 3 for multiplexor 338, with numerous other designs available for multiplexor 338 in keeping with the scope and spirit of the invention.

Additionally, in a typical configuration of a third embodiment, a bimodal switchable power supply 305 is used to select between one or more voltage levels. Typically, a 3.3/1.5V switchable voltage supply is used as voltage supply 305. In other embodiments, two or more different power supplies could be used, whether simultaneously located on board 300 or physically swapped out to match the operational mode of the illustrated circuitry. Switchable supply 305 provides a supply voltage 310 to $V_{ddq}$ 351 of AGP chip 350 and to $V_{ddq}$ 321 of AGP slot 320.

Referring now to the voltage reference signal 331 received on $V_{REF-IN}$ 322 on AGP slot 320, voltage reference signal 331 is derived from the supply voltage 310 via voltage divider (VD$_2$) 330. VD$_2$ 330 is sized according to the design specifications that may include the voltage level of the supply voltage 310 and the type of logic used in implementing an embodiment. Typically, VD$_2$ 330 is a fifty percent (50%) voltage divider circuit or some other 50% voltage reduction mechanism. In other embodiments in which AGP chip 350 produces its own reference voltage, then this reference voltage could be received on $V_{REF-IN}$ 322 directly, or via a multiplexor arrangement similar to that illustrated in FIG. 3 for $AGP_{REF}$.

Figure 4:
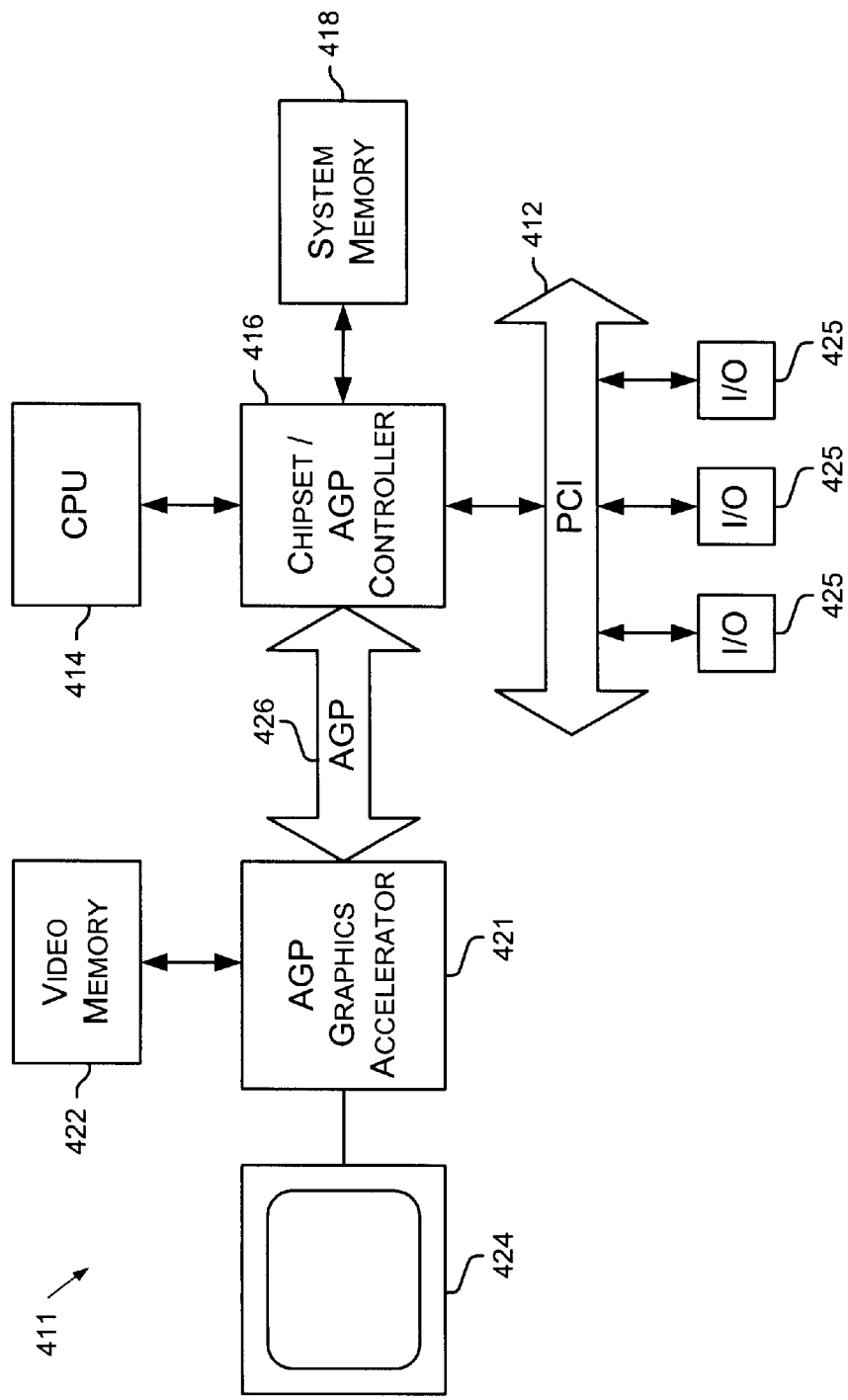
FIG. 4 is a block diagram illustrating a typical operating environment in which an embodiment of the invention may be practiced.

Turning now to FIG. 4, illustrated is one of an unlimited number of environments in which an embodiment of the invention may be practiced. Illustrated is a computer system 411 including an AGP 426. In addition to providing an AGP 426 on the system motherboard, the graphics accelerator 421 is typically AGP-compliant and includes an AGP controller. AGP 426 connects the AGP graphics accelerator 421 to chipset/AGP controller 416. In a typical configuration of the embodiment illustrated in FIG. 3, chipset/AGP controller 416 includes AGP chip 350 and AGP slot 320.

AGP 426 provides a dedicated, high-speed data connection directly between the chipset/AGP controller 416 and the graphics accelerator 421, and also frees the video traffic from the constraints of the PCI bus 412. The PCI bus 412 is designed to provide data transfer among several devices. At boot-up, each device 425 on the PCI bus is configured.

AGP 426 typically only connects two operational devices, rather than providing a transmission path for several devices. Thus, AGP 426 is referred to as a "port" rather than a "bus," because it typically provides a point-to-point connection. Typically, AGP 426 and AGP compliant devices are configured such that only two devices, the AGP graphics accelerator 421 and the system chipset/AGP controller 416, may be coupled to AGP 426.

In view of the many possible embodiments to which the principles of our invention may be applied, it will be appreciated that the embodiments and aspects thereof described herein with respect to the drawings/figures are only illustrative and should not be taken limiting the scope of the invention. To the contrary, the invention as described herein contemplates all such embodiments as may come within the scope of the following claims and equivalents thereof.

What is claimed is:

1. A system comprising:
    a first component requiring a first reference voltage;
    a second component requiring a second reference voltage;
    a power source to produce a supply voltage;
    a first voltage reducer electrically coupled to the power source, the first voltage reducer to produce a third reference voltage using the supply voltage;
    a multiplexor electrically coupled to the first voltage reducer to produce the first reference voltage by selecting between at least the third reference voltage and a fourth reference voltage; and
    a second voltage reducer electrically coupled to the power source and to the second component, the second voltage reducer to produce the second reference voltage using the supply voltage.

2. The system of claim 1, wherein the power source is selectively operable to produce at least one of a first supply voltage and a second supply voltage, and the multiplexor is operable to,select the third reference voltage when the power supply produces the first supply voltage.

3. The system of claim 2, further comprising a selection signal electrically coupled to a selection input of the power source and a selection input of the multiplexor.

4. The system of claim 1, wherein the power source is selectively operable to produce at least one of a first supply voltage and a second supply voltage, and the multiplexor is operable to select the fourth reference voltage when the power supply produces the second supply voltage.

5. A system comprising:
    a power source to produce a supply voltage;
    a first component requiring a first reference voltage, the first component including: a first voltage reducer electrically coupled to the power source, the first voltage reducer to produce a third reference voltage using the supply voltage; and a multiplexor electrically coupled to the first voltage reducer to produce the first reference voltage by selecting between at least the third reference voltage and a fourth reference voltage;
    a second component requiring a second reference voltage; and
    a second voltage reducer not located on the first component of the system and electrically coupled to the power source and the second component, the second voltage reducer to produce the second reference voltage using the supply voltage.

6. The system of claim 5, wherein the power source is selectively operable to produce at least one of a first supply voltage and a second supply voltage, and the multiplexor is operable to select the third reference voltage when the power supply produces the first supply voltage.

7. The system of claim 6, further comprising a selection signal electrically coupled to a selection input of the power source and a selection input of the multiplexor.

8. The system of claim 5, wherein the power source is operable to produce at least one of a first supply voltage and a second supply voltage, and the multiplexor is operable to select the fourth reference voltage when the power supply produces the second supply voltage.

9. The system of claim 5, wherein the first voltage reducer includes a voltage divider circuit.

10. The system of claim 5, wherein the first component is a chip and the second component is a slot for receiving the chip.

11. The system of claim 5, wherein the second component is an Accelerated Graphics Port (AGP) slot receiving the first component.

12. A chip requiring a first reference voltage, the chip comprising:
    a first voltage reducer electrically coupled to receive a supply voltage, the first voltage reducer to produce a second reference voltage using the supply voltage; and
    a multiplexor electrically coupled to the first voltage reducer and to receive a third reference voltage, the multiplexor operable to produce the first reference voltage by selecting between at least the second reference voltage and the third reference voltage.

13. The chip of claim 12, further electrically coupled to receive a selection signal, the selection signal electrically coupled to a selection input of the multiplexor.

14. The chip of claim 13, wherein the chip is an Accelerated Graphics Port compliant component.

15. A method performed by a chip for generating a first reference voltage, the method comprising:
    receiving a second reference voltage;
    receiving a third reference voltage;
    reducing the third reference voltage;
    receiving a selection signal; and
    selecting as the first reference voltage, the second reference voltage or the reduced third reference voltage based on the received selection signal.

16. The method of claim 15, wherein reducing the third reference voltage includes a voltage divider circuit reducing the third voltage.

17. The method of claim 15, wherein the chip is an Accelerated Graphics Port compliant component.

* * * * *

UNITED STATES PATENT AND TRADEMARK OFFICE
CERTIFICATE OF CORRECTION

PATENT NO. : 6,769,041 B2
DATED : July 27, 2004
INVENTOR(S) : Dahlen et al.

It is certified that error appears in the above-identified patent and that said Letters Patent is hereby corrected as shown below:

Column 5,
Line 33, insert -- as -- before the word "limiting".
Line 57, delete "to,select" and insert -- to select --.

Signed and Sealed this

Twenty-first Day of September, 2004

JON W. DUDAS
*Director of the United States Patent and Trademark Office*